Feb. 21, 1933.     W. H. VON HACHT     1,898,024
LICENSE PLATE HOLDER
Filed July 10, 1931
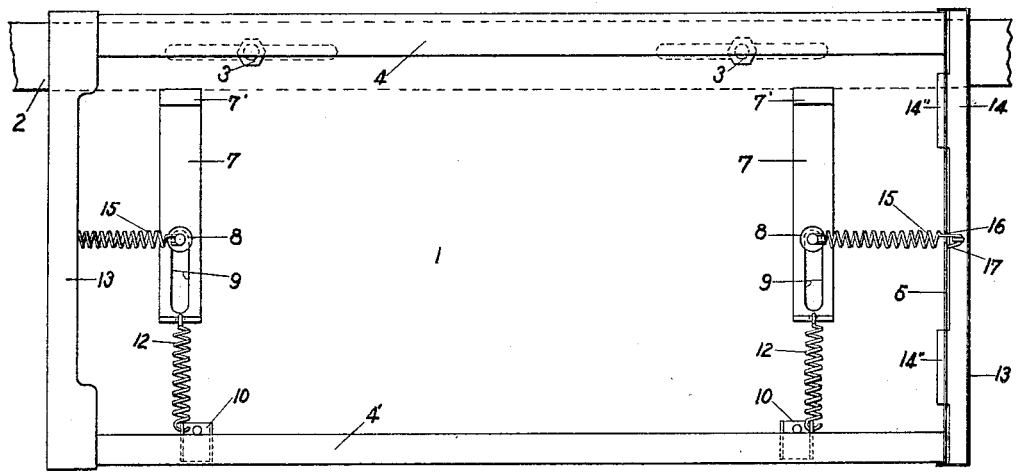
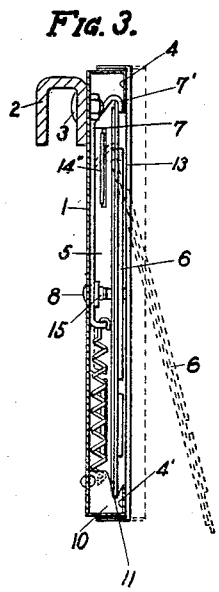
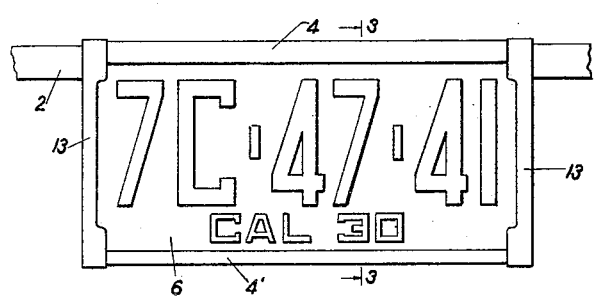
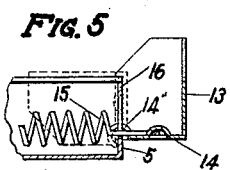
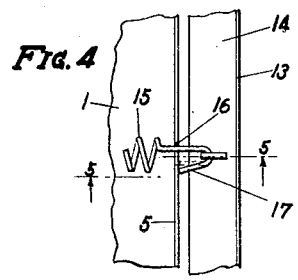
INVENTOR.
WILLIAM H. VON HACHT
BY
*Miller, Boyken & Bried*
ATTORNEYS.

Patented Feb. 21, 1933

1,898,024

UNITED STATES PATENT OFFICE

WILLIAM H. von HACHT, OF SAN FRANCISCO, CALIFORNIA

LICENSE PLATE HOLDER

Application filed July 10, 1931. Serial No. 549,961.

This invention relates to automobile license plate holders of the type secured to the automobile and has for its objects improvements in such holders to facilitate the insertion and removal of the license plate from the holder and to fully protect the license plate across the back and edges and to rigidly hold it in position in the holder.

In the drawing, Fig. 1 is a front view of the holder with the license plate in position and showing a portion of the bracket adapted for securing the holder to the automobile.

Fig. 2 is a front view of the holder only with the license plate removed and an end open to show structure.

Fig. 3 is an enlarged sectional view as seen from line 3—3 of Fig. 1 with the license plate in elevation to avoid confusion.

Fig. 4 is an enlarged fragmentary view of a portion of the opened end of the holder shown in Fig. 2.

Fig. 5 is a sectional view along the line 5—5 of Fig. 4.

In detail, 1 represents a horizontally disposed rectangular supporting plate, which plate is secured to the ordinary license plate bracket 2 in a vertical plane, the bracket being secured to the rear or front of an automobile by any suitable means not shown, such brackets being common form and construction. The plate 1 is secured to the bracket at spaced points adjacent the upper ends of bolts 3 which clamp the plate to the bracket as best indicated in Fig. 3.

The upper and lower edges of plate 1 are bent forwardly and then inwardly a short distance with right angle bends forming upper and lower margins or frame portions 4, 4' respectively which frame portions are parallel with and spaced forwardly from the plane of the plate and overhang the front face of the plate 1 at the margins, the plate preferably being of sheet metal.

The ends of the plate are bent forwardly as at 5 with the forward edges of the bent portions terminating substantially flush with the frame members or margins 4, 4' whereby the margins 4, 4' and edges of ends 5 are in a plane spaced from and parallel with the plane of plate 1 having a space between the two planes in which a license plate 6 is adapted to be positioned together with mechanism carried by the plate 1 for retaining the license in position.

The mechanism retaining the license plate in its position comprises a pair of spaced vertically extending metal straps 7 vertically slidable against plate 1 and retained thereagainst by rivets 8 secured at an end each to the plate 1 and extending through an elongated vertically extending slot 9 in each of the straps with a head on the rivets formed to overlap the strap at the sides of the slot.

The upper ends of the straps each are outwardly inclined from the plate 1 and terminate in a downwardly hooked end 7' the outer surface of the hook being flush with the lower surface of the marginal member 4 to permit the hooked end to slide therebeneath.

Between the lower marginal member 4' and plate 1 I provide a pair of short vertically disposed channel shaped lugs 10 horizontally spaced from each other and riveted through the web of each to the plate 1, and each lug has a horizontally extending groove 11 cut along the upper side thereof with the open side of the groove facing the open side of the hooked end of the straps 7 and in the same plane as best indicated in Fig. 3 of the drawing.

Straps 7 are bent outwardly a short distance at their lower ends each to provide an outwardly extending projection for securing an end of a coil spring 12 thereto, which spring extends vertically downward from its attachment to the strap and is secured at its opposite end to lug 10. This spring is adapted to resiliently pull the strap 7 downward against the rivet 8 at the upper end of slot 9.

At the ends of the holder are a pair of vertically extending corner strips, one leg 13 of which normally overlies the outer edge of ends 5 of plate 1 and the other leg 14 normally extends along the outer surface of end 5 at right angles to the leg 13 of the corner strip. Leg 14 is provided along its vertical free edge with a pair of spaced projections

14" extending inwardly through corresponding openings in the end 5 providing a fulcrum whereby the cover strip is pivoted relative to end 5 on a vertical axis extending through the projections, and the leg 13 upon outward pivoting of the strip is clear of the face of the plate 1 as indicated in Figs. 2, 4 and 5.

The corner strip is normally held closed, with the leg 13 overlapping the ends 5, by means of a coil spring 15 secured at an end to leg 14, the end of the spring adjacent leg 14 extending through slot 16 in the end 5 and the opposite end of the spring looped over the inner end of rivet 8 or secured thereto in any suitable manner.

In order that the corner strips may be held in open position the end of the spring 15 is provided with a hook, or doubled on itself as indicated in Fig. 4, the hook engaging in the bend a loop formed on the inner side of leg 14. The free end 17 of the hook in the spring 15 normally tends to spread away from the end of the spring on which it is doubled but in the closed position of the corner strip it is retained against the end of the spring by the sides of the slot in end 5. However, when the corner strip is fully opened the end 17 slips out of the slot 16 and the corner strip will be held open until the end 17 of the spring is pressed over to re-enter the slot 16. This is readily done with the fingers.

In operation with the holder in position on the automobile with the end strips closed and without the license plate, all that is required to insert the license number plate is to open the end strips as described, engage the upper edge of the license in the hooked upper ends of straps 7 as indicated in dotted line in Fig. 3, push the license upward against the resistance of springs 12 until the lower edge of the license will slip over the upper edge of margin 4' and engage in the grooves 11 in the lugs 10. Since the end edges of the license plate when it is held in position between the lugs 11 and hooks 7' are between ends 5 and below the outer edges of said ends, there can be no lateral shifting and as the springs 12 normally tend to rigidly hold the plate between hooks 7' and lugs 10, and the plate will not rattle or work loose.

The hinged corner strips formed by legs 13, 14 are allowed to close as has been described so that the legs 13 cover the ends of the license plate forming a pleasing frame therearound without the sight of any bolts, nuts, screws, or screw holes.

It is important to note that by completely covering the back, edges, and front margins of the license plate, the plate is protected against any injury such as is common where the rear of the license plate holders are open or the edges exposed.

In removing the license plate from the holder the reverse of inserting the plate is followed, the rough surface of the members themselves, as indicated in Fig. 3, providing ample friction for engagement by the fingers in the operation.

Having described the invention, I claim:

1. A license plate for automobiles comprising a substantially rectangular vertically disposed supporting plate completely covering the rear surface of a rectangular license plate adapted to be supported thereon in a plane substantially parallel therewith and opposed thereto, means carried by the supporting plate engaging over the top and bottom horizontal edges of the license plate securing the license plate thereto, the upper and lower edges of said supporting plate bent forwardly and inwardly toward each other to overhang the upper and lower front margins only of the license plate, a pair of vertical positioned strips vertically pivoted at an edge each to the opposite vertical ends of the supporting plate respectively to swing to a closed and open position, said strips adapted to overlie the front vertical end margins of the license plate when in closed position and to uncover the end margin when swung to open position, means resiliently holding said strips in closed position and means positively holding the strips in open position.

2. A license plate holder for automobiles comprising a vertically disposed plate completely covering the rear surface of a substantially rectangular license plate adapted to be supported thereon in a plane substantially parallel therewith and opposed thereto, a vertically disposed sheet metal strap slidably secured to the face of the supporting plate adjacent the license plate for vertical movement, the upper end of said strap formed with a downwardly opening hook adapted to engage over the upper edge of the license plate, a lug projecting forwardly from said mentioned face along the lower margin of the supporting plate and secured thereto arranged and adapted for supporting the lower edge of the license plate, a spring connecting at an end to the lower end of the strap and at the opposite end to said lug arranged and adapted to normally pull the hook end of the strap in engagement with the edge of the plate for resiliently holding the plate between the strap and the lug.

3. A license plate holder comprising a vertically disposed supporting plate completely covering the rear surface of a license plate adapted to be supported thereon in a plane substantially parallel therewith and opposed thereto, means engaging over the upper and lower edges only of the license plate, a lug adjacent the lower edge of the license plate and provided with a depression in the upper side thereof for receiving the lower edge of the license plate, a downwardly opening hook adapted to engage over the upper edge of the license plate, said hook being slidably secured to the face of the supporting plate adjacent the license plate and spring urged means associated therewith resiliently urging the hook downwardly against the upper edge of the license plate for holding the license plate between the hook and the lug.

WILLIAM H. von HACHT.